United States Patent [19]

Weiste et al.

[11] 3,736,845
[45] June 5, 1973

[54] VARIABLE LENGTH UPPER GUIDE ROD FOR A THREE-POINT LOADING RACK

[76] Inventors: Helmut Weiste, 4771 Sieningsen; Ferdinand Schumacher, Coesterweg 42, Soest, both of Germany

[22] Filed: May 18, 1971

[21] Appl. No.: 144,527

[30] Foreign Application Priority Data

May 22, 1970 Germany..................P 20 25 040.2

[52] U.S. Cl. ...............91/390, 60/52 HE, 60/DIG. 2, 91/363 R
[51] Int. Cl................................................F15b 13/16
[58] Field of Search.....................60/52 HE, DIG. 2; 91/390, 391 R, 363 R, 437, 447, 468

[56] References Cited

UNITED STATES PATENTS

| | | | |
|---|---|---|---|
| 1,791,013 | 2/1931 | Rudolph | 60/52 R X |
| 2,451,263 | 10/1948 | Webb | 91/363 R |
| 2,524,055 | 10/1950 | Hubert | 60/52 HE UX |
| 2,543,989 | 3/1951 | Rockwell | 60/52 HE |
| 2,674,092 | 4/1954 | Gardiner | 60/52 S X |
| 3,340,897 | 9/1967 | Nevulis | 91/461 X |

Primary Examiner—Edgar W. Geoghegan
Attorney—John J. McGlew and Alfred E. Page

[57] ABSTRACT

A hydraulic three-point loading rack, for agricultural prime movers, has a variable length upper guide rod in the form of a cylinder, a piston guided in the cylinder, a piston rod connected to the piston and hydraulic supply-return lines connected to the cylinder chambers on opposite sides of the piston. Respective normally closed, pressure-holding valves are connected in each of the two supply-return lines and opened only by a predetermined supply pressure in the associated line, these valves being interposed between a hydraulic pump, with associated return reservoir, and the cylinder chambers. A distributing valve is connected between the pump and the shut-off valves and has a neutral position shutting off both cylinder chambers from the pump, and a pair of operating positions, in each of which one line is supplied with hydraulic fluid and the other line returns hydraulic fluid to the reservoir. A nominal-actual value setter is associated with an actual value selsyn connected to the piston rod, and may be selectably bypassed. A three-way cock is connected to the two supply-return lines and communicates with the reservoir.

8 Claims, 1 Drawing Figure

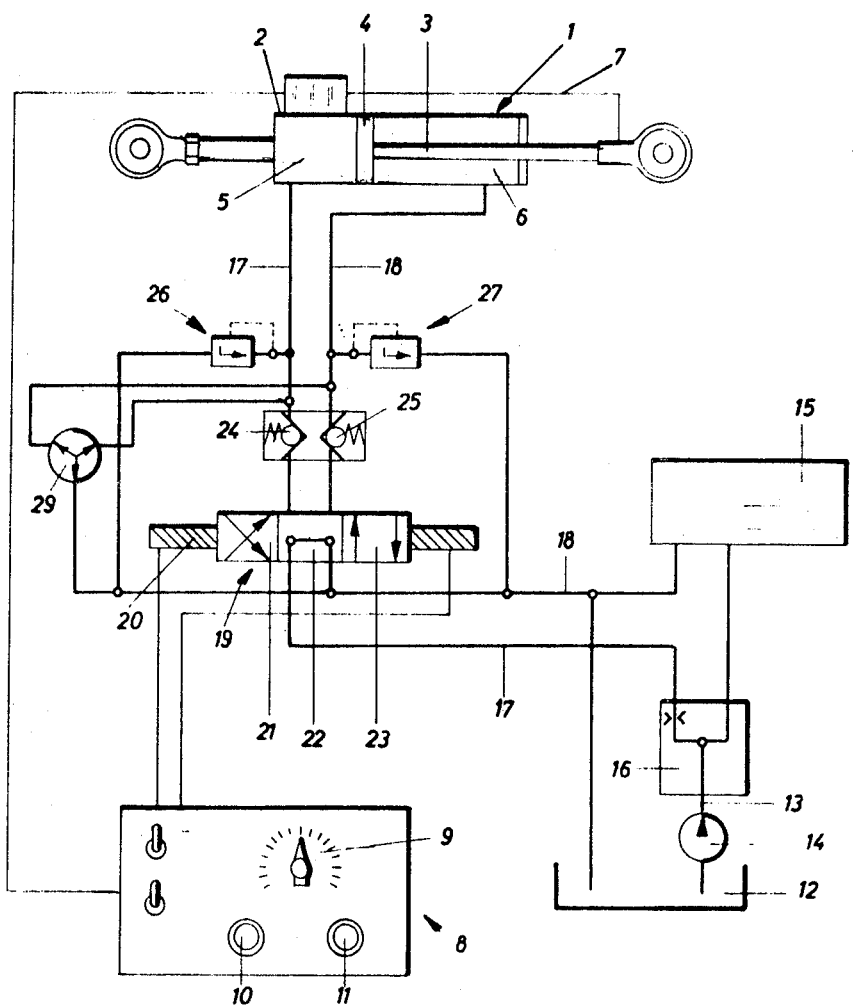

VARIABLE LENGTH UPPER GUIDE ROD FOR A THREE-POINT LOADING RACK

BACKGROUND OF THE INVENTION

The implements to be drawn by an agricultural prime mover such as, for example, a tractor, are usually hitched to the tractor by a so-called hydraulic three-point loading rack. It is known already to make the upper guide rod of this three-point loading rack variable in length in order to permit, in this manner, adaptation to the various sizes of implements to be drawn by the tractor.

The industry is making efforts to provide for effecting these necessary length variations of the upper guide rod hydraulically, in adaptation to the different drawn implements, without the driver of the tractor having to leave his seat. Furthermore, it must be possible to vary the length of the upper guide rod, from the driver's seat on the basis of knowledge of the size and dimensions of the implement to be attached to the loading rack, so that the length of the guide rod is adapted immediately to the particular implement to be attached. Finally, it must be possible, once this adapted length has been set, to lock it so that accidental variations of the length of the upper guide rod are impossible.

Various proposals have been made already, as in German patents 1,273,891 and 1,195,079, with respect to how to effect these length variations and how to make it possible to lock the upper guide rod once the length has been set. While, in one device, the upper guide rod is locked mechanically, which has the disadvantage that fixed locking is possible only once, the locking of the upper guide rod is effected, in another known device, by a regulator arranged in the hydraulic line. This known device can not be effective either, because it does not take into consideration that the volume ratio is different, in that cylinder chamber contained in the piston rod, from the other cylinder chamber which does not have the piston rod therein.

SUMMARY OF THE INVENTION

This invention relates to variable length upper guide rods for hydraulic three-point loading racks of agricultural prime movers and, more particularly, to an improved and simple variable length upper guide rod which can be readily attached to an agricultural prime mover, on the one hand, and on the other hand, is not susceptible to trouble while working satisfactorily even in rough agricultural operations.

The underlying objective of the invention is attained by inserting, in each of the two hydraulic supply-return lines, a shut-off valve controlled by the pressure in the associated line to actuate the upper guide rod, and by interposing a hydraulic distributing slide valve between the pump generating the hydraulic pressure and the shut-off valves. This distributing slide valve permits shutting off the cylinder from the pressure medium supply, in dependence on a position of the valve, or to connect one or the other cylinder chambers selectively to the pressure medium supply and the opposite chamber to the pressure medium return. In accordance with the invention, a three-way cock is also provided and it is operable to connect both cylinder chambers to the return line for the pressure medium flowing to the tank or reservoir, when the pressure medium supply is shut-off, so that a so-called "floating position" of the upper guide rod is assured.

In accordance with the preferred embodiment of the invention, the length of the piston rod extending from the stationary cylinder is checked by an actual value selsyn, and the hydraulic distributing valve is actuated electronically, electrically, mechanically, or in any other way by a nominal-actual value setter fed by the actual value selsyn. However, in accordance with the invention, it is further provided that the hydraulic distributing slide valve can be actuated independently of the nominal-actual value setter.

The pressure medium for adjusting and setting the variable length upper guide rod is drawn from the commercial hydraulic system of the prime mover through a branch circuit therefrom, and corresponding hydraulic current regulating valves can be arranged in this branch circuit in order to limit the amount of pressure medium required for controlling the length of the upper guide rod. Additionally, pressure limiting means are provided between the cylinder and the shut-off valves to assure that overpressures, which may be produced by the displacement of the cylinder, can not lead to destruction of the overall arrangement.

It will be clear that it is possible, using the device embodied in the invention, to regulate the length of the upper guide rod from the driver's seat without the driver having to leave his seat for such regulation, and that automatic adaptation of the length of the upper guide rod to the dimensions of the implement to be drawn by the tractor is possible in correspondence with preset values.

An object of the invention is to provide an improved variable length upper guide rod for a hydraulic three-point loading rack for agricultural prime movers.

Another object of the invention is to provide such a variable length upper guide rod which is so simple that it can be readily attached to an agricultural prime mover, such as a tractor.

A further object of the invention is to provide such a variable length upper guide rod which is so non-susceptible to trouble that it works satisfactorily even in rough agricultural operations.

For an understanding of the principles of the invention, reference is made to the following description of a typical embodiment thereof as illustrated in the accompanying drawing.

BRIEF DESCRIPTION OF THE DRAWING

In the drawing, the single FIGURE is a schematic hydraulic and electrical diagram of a variable length upper guide rod embodying the invention.

DESCRIPTION OF THE PREFERRED EMBODIMENT

Referring to the drawing, an upper guide rod 1 of a hydraulic three-point loading rack, for agricultural prime movers, comprises a cylinder 2 in which there reciprocates a piston 4 connected with a piston rod 3, piston 4 dividing cylinder 2 into two cylinder chambers 5 and 6. Upper guide rod 1 is provided with a so-called "actual selsyn" 7 which checks the length variations or extent of the piston rod 3 relative to the stationary cylinder 2, and transmits the determined values to a nominal-actual value setter 8 which has a nominal value knob 9. In addition, setter 8 is provided with two switches 10 and 11 which permit actuating piston 4 independently of the nominal-actual value setter 8.

An oil tank or reservoir is connected to a supply line 13 to which oil, from reservoir 12, is fed by a pump 14. The pump normally supplies the oil through hydraulic line 13 to the so-called "power lift" block or assembly 15, which need not be described in detail here since it is a commercial type and serves to actuate the hydraulic means otherwise provided on the tractor or other prime mover. Line 13 has arranged therein a hydraulic current regulating valve 16 which branches off a small or restricted adapted oil current from line 13 and feeds it to a supply line 17 leading to cylinder 2 of upper guide rod 1. The hydraulic fluid return line, leading back to tank 12, is indicated at 18.

Interposed in lines 17 and 18 there is a hydraulic distributing slide valve 19 which is actuated by electronic, electric, mechanical, hydraulic, or other means by the nominal-actual value setter 8, as indicated by the operating shaft 20 connected by lines to setter 8. Hydraulic distributing slide valve 19 has three switch groups or flow channels which are designated, respectively, as 21, 22 and 23. Switch group 21 serves to feed hydraulic fluid or oil under pressure from line 17 to cylinder chamber 6, when distributing slide valve 19 has been displaced to a position in which switch group 21 is connected to supply-return lines 17 and 18. Switch group 22 is illustrated in the zero position, in which cylinder 2 is shut off from the supply of pressure medium. Switch group 23 serves to feed the hydraulic fluid under pressure to cylinder chamber 5, when connected to lines 17 and 18.

Between hydraulic distributing slide valve 19 and cylinder 2 there are arranged, in each of the two supply-return lines, respective shut-off valves 24 and 25 which open under pressure and close the associated line under reduced pressure, so that leakage of oil or hydraulic fluid from cylinder 2 is positively prevented.

Additionally, pressure limiting means 26 and 27 are arranged between cylinder 2 and shut-off valves 24 and 25, and have the function to prevent, if the lines are overloaded, damage to the lines. This is necessary, since a certain line pressure must be provided, without which shut-off valves 24 and 25 must not open, in order to prevent upper guide rod 1 from being already shifted, in the case of very heavy implements to be drawn by the prime mover, for example, without a corresponding shifting or length adjusting movement having been initiated by the hydraulic system.

Finally, a three-way cock 29 is connected to lines 17 and 18 and, as can be seen clearly from the illustrated connection, this three-way cock permits a floating position of the upper guide rod 1, with valve 19 in its neutral position 22, since it switches the line sections of lines 17 and 18, between cylinder 2 and shut-off valves 24 and 25, directly into return line 18 so that the hydraulic fluid or oil can return unhindered into tank or reservoir 12 during movements of the upper guide rod.

The method of operation of the device embodying the invention will now be described. If the nominal value is set on setter knob 9, and if the length of upper guide rod 1 as measured by the actual selsyn 7 is not in agreement with the nominal value, the nominal-actual value setter 8 switches hydraulic distributing slide valve 19 so that piston 4 is so displaced, by selective supply of hydraulic working fluid under pressure, to one or the other of the chambers 5 and 6 that the nominal value and the actual value are in agreement.

If nominal value setter knob 9 is set to zero, as shown in the drawings, actuation of piston 4 by operating means 10 and 11 is possible without the nominal-actual value setter 8 becoming operative. If the floating position is set, the three-way cock 29 is moved into the position illustrated in the drawing, so that the line sections of the pressure medium lines between cylinder 2 and shut-off valves 24 and 25 are connected to return line 18 to assure return of the hydraulic fluid to tank or reservoir 12.

While a specific embodiment of the invention has been shown and described in detail to illustrate the application of the principles of the invention, it will be understood that the invention may be embodied otherwise without departing from such principles.

What is claimed is:

1. In a variable length upper guide rod for a hydraulic three-point loading rack, for agricultural prime movers, of the type including a cylinder, a piston guided in the cylinder, a piston rod connected to the piston, and hydraulic supply-return lines connected to the cylinder chambers on opposite sides of the piston, the improvement comprising, in combination, a pump connected to a supply of hydraulic fluid to generate hydraulic working fluid under pressure; respective normally closed, pressure-holding shut-off valves connected in series in each of the two supply-return lines and opened only responsive to a predetermined supply pressure in the associated line; and a distributing valve connected between said pump and said shut-off valves, and operable selectively to shut-off both cylinder chambers from said pump, in a neutral position, and to connect a respective different chamber to said pump and the other chamber to said supply, in each of two operating positions.

2. In a variable length upper guide rod for a hydraulic three-point loading rack, for agricultural prime movers, of the type including a cylinder, a piston guided in the cylinder, a piston rod connected to the piston, and hydraulic supply-return lines connected to the cylinder chambers on opposite sides of the piston, the improvement comprising, in combination, a pump connected to a supply of hydraulic fluid to generate hydraulic working fluid under pressure; respective normally closed, pressure-holding shut-off valves connected in series in each of the two supply-return lines and opened only responsive to a predetermined supply pressure in the associated line; a distributing valve connected between said pump and said shut-off valves, and operable selectively to shut-off both cylinder chambers from said pump, in a neutral position, and to connect a respective different chamber to said pump and the other chamber to said supply, in each of two operating positions; and a three-way cock connected to both cylinder chambers and to said supply, and selectively operable to connect both cylinder chambers to a return line leading to said supply.

3. In a variable length upper guide rod, the improvement claimed in claim 1, including an actual selsyn operatively associated with said piston rod and measuring the effective length of said upper guide rod; and a nominal-actual value setter connected to said selsyn and to said distributing valve and operating said distributing valve to set the length of said upper guide rod to correspond to a preset value set by said nominal-actual value setter.

4. In a variable length upper guide rod, the improvement claimed in claim 3, including operating means operable to set said distributing valve in each of its three positions; and control lines interconnecting said operating means and said nominal-actual value setter.

5. In a variable length upper guide rod, the improvement claimed in claim 3, including means selectively operable to operate said distributing valve independently of said nominal-actual value setter.

6. In a variable length upper guide rod, the improvement claimed in claim 1, including a commercial hydraulic system, of the agricultural prime mover, connected to said pump; the working fluid for said cylinder being supplied from said commercial hydraulic system.

7. In a variable length upper guide rod, the improvement claimed in claim 6, including a restricted flow branch line connecting said system to said distributing valve.

8. In a variable length upper guide rod, the improvement claimed in claim 1, including respective pressure limiting means connected in each of said supply-return lines between the associated cylinder chambers and the associated shut-off valves.

* * * * *